Patented Oct. 2, 1923.

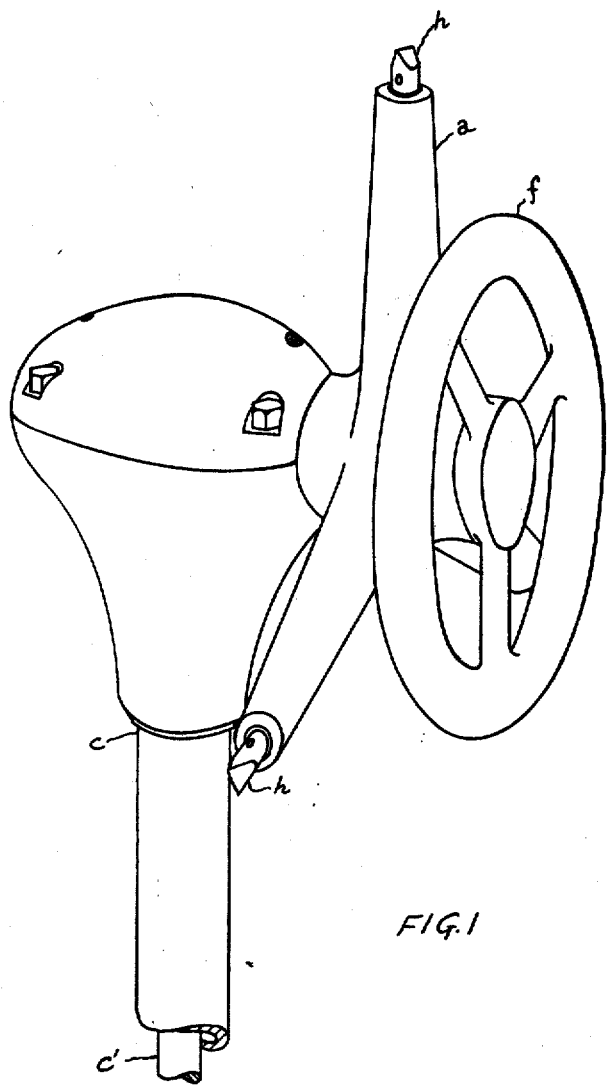

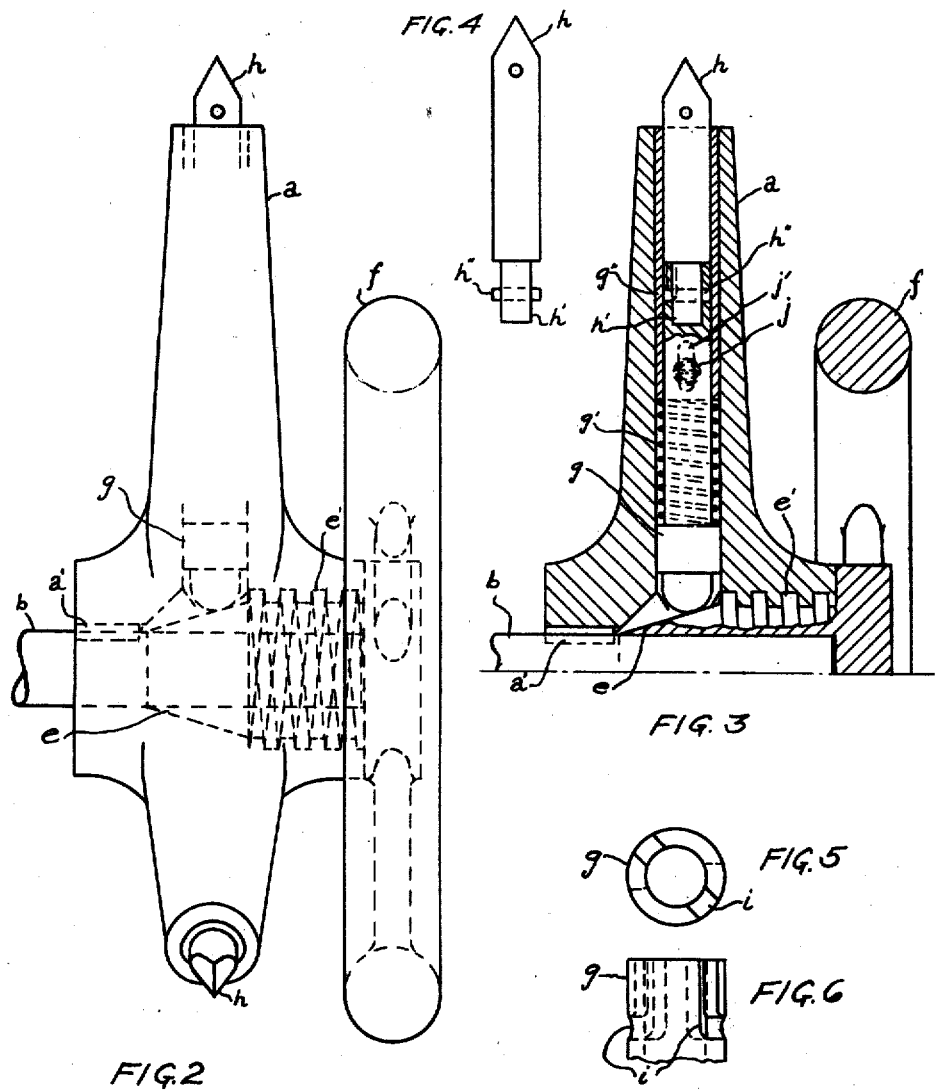

1,469,754

UNITED STATES PATENT OFFICE.

JOHN W. DIRKSON, OF KENT, AND LEE E. CLOUGH, OF AKRON, OHIO, ASSIGNORS TO THE MASON TIRE AND RUBBER COMPANY, A CORPORATION OF OHIO.

CORE CHUCK.

Application filed October 15, 1920. Serial No. 417,220.

*To all whom it may concern:*

Be it known that we, JOHN W. DIRKSON, a citizen of the United States, residing at Kent, in the county of Portage and State of Ohio, and LEE E. CLOUGH, a citizen of the United States, residing at Akron, in the county of Summit and State of Ohio, have invented certain new and useful Improvements in a Core Chuck, of which the following is a specification.

Our invention relates to improvements in core chucks, and has for its object, the provision of a chuck for rotatably supporting the cores for building the carcasses of automobile tires, and one that is more rapid and convenient in operation during the construction of the carcass, than any chuck of the prior art. Moreover, our improved chuck best lends itself to employment with annular cores of different diameters, being capable of ready conversion for use with widely different sizes of cores.

The features of our improvements reside in the compact structure afforded by the employment of a short shaft and an externally threaded conical member operated by the hand-wheel, while convertible studs are adapted to be inserted in the arms of the chuck and are held in position by a bayonet lock joint.

The features of our improvements may be more readily explained in connection with the accompanying drawings, wherein Fig. 1 is a perspective view of the chuck and its stand broken away near the upper portion thereof.

Fig. 2 is a side elevation of the chuck and handwheel, also indicating the operating mechanism in dotted lines.

Fig. 3 is a fragmentary section thru one of the arms of said chuck.

Fig. 4 is a view of one of the adjustable studs.

Fig. 5 is a top view, and,

Figure 7:
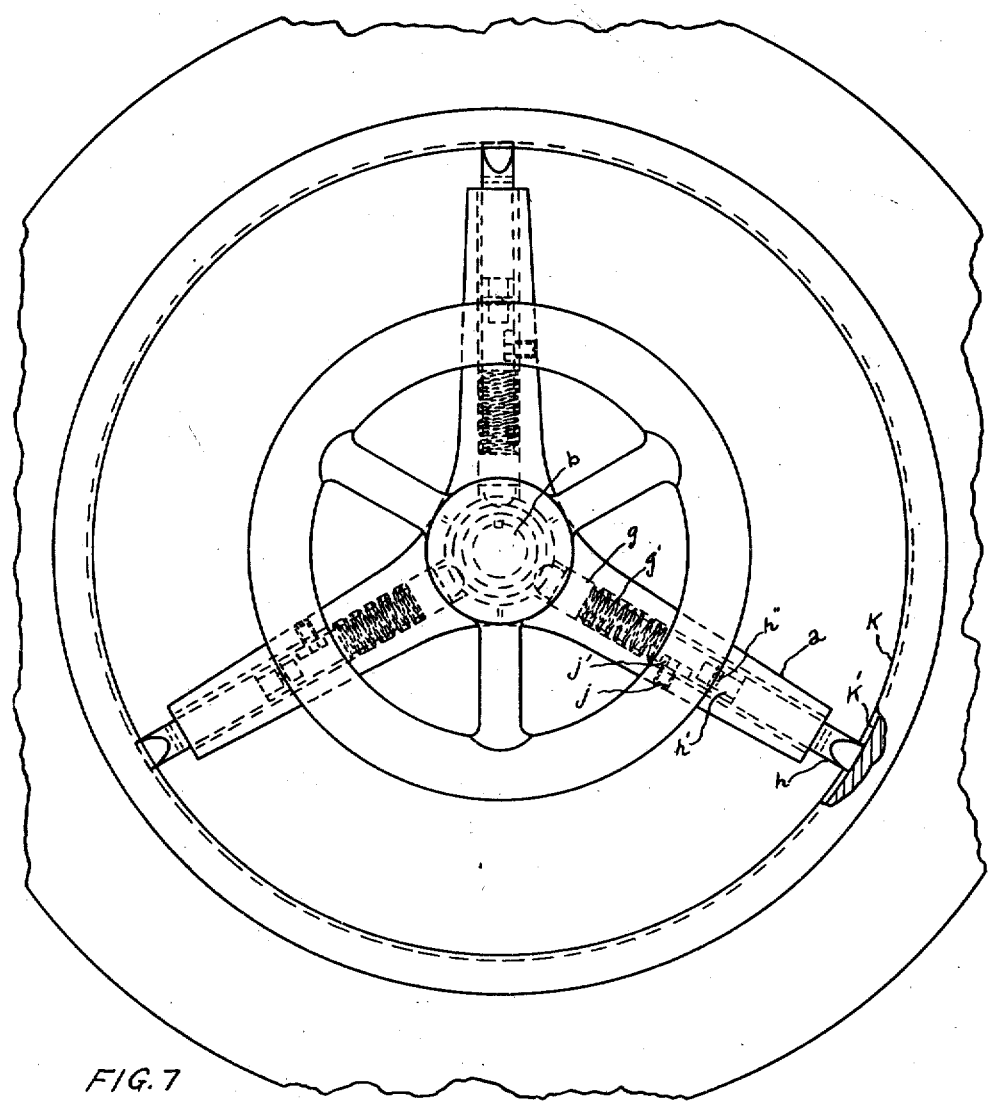

Fig. 6 a fragmentary side view of the bayonet lock for the studs, shown upon an enlarged scale, and Fig. 7 is a front elevation with an annular core mounted in position thereon.

Throughout the several figures of the drawing we have employed the same character of reference to indicate similar parts.

The three armed casting $a$ is provided upon the short shaft, $b$ adapted for rotation within the stand, $c$ by means of a vertical shaft, $c'$, and connecting beveled gears not shown in the drawing. Said casting is keyed at $a'$ upon the shaft while a conical member $e$ provided preferably with large righthand square cut threads, $e'$, is inserted at the front of the casting and is adapted for actuation therein by means of an extra size handwheel $f$. These threads being exteriorly positioned upon said conical member and of such large size, permit the rapid actuation of said conical member and thereby, the stud actuating means respectively contained in each of the three arms.

These means comprise, respectively, the shouldered bolt, $g$, inwardly bearing upon the cone and depressed against the same by spring $g'$, which reacts against the stationary tubular member $g''$.

The outer end of member $g$ is bored out to receive the reduced shank $h'$, of stud $h$, said shank having a cross pin $h''$ inserted near its end. This pin in turn is adapted to be inserted in the bayonet locking slots $i$, provided at the outer end of member $g$, as best shown in Figs. 5 and 6.

A screw $j$ is inserted in each of the arms $a$ with its terminal engaging the intermediate slot $j'$ cut in member $g$. This serves to prevent the partial rotation of said member and its connecting stud, which is preferably provided with chisel-edge adapted to enter a corresponding slot $k'$ in the annular core $k$, when positioned upon the chuck.

The action of the springs firmly presses each of the sliding bolts or members $g$, inwardly against the conical member $e$, however, the sliding bolts are adapted to be rapidly actuated outwardly in radial directions by screwing in the member $e$ by means of handwheel $f$ to the position shown in Fig. 3, thereby extending or expanding the engaging studs radially into a locking relation with the interior of the core $k$.

It will be appreciated that longer or shorter studs, as for example, the studs respectively shown in Figs. 3 and 4, may very readily be inserted within their respective bayonet locks in arms $a$, whereby the chuck is adapted for use with annular cores of widely varying sizes. This is of advantage when the production of different sizes of carcasses varies from time to time, so that the chucks in a very few moments may be adjusted to accommodate any desired size of annular core.

Having now described the embodiment of our invention or improvement, we claim as new, and desire to secure by Letters Patent, the following:—

1. In a chuck for supporting annular cores, the combination with a plurality of radial arms, of extensible members carried by said arms in position to engage the core, a conical member reacting against the inner portions of said extensible members, an exterior thread and an actuating handwheel rigidly connected with and adapted to operate said conical member, substantially as set forth.

2. In a chuck for supporting annular cores, the combination with a short rotatably actuated shaft, of a plurality of radial arms mounted thereon, extensible members respectively positioned in said arms, an actuating cone operatively associated with the inner ends of said members and having an exterior thread sleeved upon the shaft and an actuating wheel for said threaded portion and cone, substantially as set forth.

3. In a chuck of the class described, the combination with a mounting shaft, of an actuating member comprising an operating cone and a screw having a large exterior thread cut thereon, means for rotating said cone, and extensible members adjustably actuated by the cone, substantially as set forth.

In testimony whereof we do now affix our signatures.

JOHN W. DIRKSON.
LEE E. CLOUGH.